United States Patent [19]

Keto-Tokoi

[11] Patent Number: 5,791,847

[45] Date of Patent: Aug. 11, 1998

[54] WASHER AND METHOD FOR USING THE WASHER

[75] Inventor: Jyrki Matti Keto-Tokoi, Tampere, Finland

[73] Assignee: Kvaerner Tamturbine OY, Tampere, Finland

[21] Appl. No.: 647,916

[22] PCT Filed: Nov. 30, 1994

[86] PCT No.: PCT/FI94/00540

§ 371 Date: May 30, 1996

§ 102(e) Date: May 30, 1996

[87] PCT Pub. No.: WO95/15443

PCT Pub. Date: Jun. 8, 1995

[30] Foreign Application Priority Data

Nov. 30, 1993 [FI] Finland ................ 935331

[51] Int. Cl.$^6$ ..................... F16B 33/00; F16B 43/00
[52] U.S. Cl. ..................... 411/368; 411/535; 411/909
[58] Field of Search ..................... 411/368, 360, 411/361, 531, 535, 909, 546

[56] References Cited

U.S. PATENT DOCUMENTS

| | | |
|---|---|---|
| 4,120,230 | 10/1978 | Schutzler . |
| 4,450,616 | 5/1984 | Morita . |
| 4,501,058 | 2/1985 | Schultzer . |
| 4,884,934 | 12/1989 | Ikeda et al. . |
| 4,897,006 | 1/1990 | Blin . |
| 5,010,949 | 4/1991 | Dehaine ................ 411/909 X |

FOREIGN PATENT DOCUMENTS

| | | |
|---|---|---|
| 37 33 243 | 10/1987 | Germany . |
| 62-116292 | 5/1987 | Japan . |

*Primary Examiner*—Neill R. Wilson
*Attorney, Agent, or Firm*—Law Offices Pollock, Vande Sande & Priddy

[57] ABSTRACT

A plate-like washer of generally annular shape and a method of using the washer for pre-tensioning. The washer is adapted to be placed between a fastening element, used to attach two pieces to form a coupling, and a piece to be fastened. The washer is manufactured from a shape-memory metal whose upper transformation temperature is higher than the highest use and assembly temperature of the coupling. The thickness of the washer is adapted in view of the length and pre-tensioning need of the fastening element, as well as the expansion of the washer at the upper transformation temperature. The washer is actively heated to its upper transformation temperature and undergoes a phase transformation which expands the washer and pre-tensions the coupling to the desired degree.

4 Claims, 1 Drawing Sheet

WASHER AND METHOD FOR USING THE WASHER

FIELD OF THE INVENTION

The invention relates to a screw coupling where a certain amount of prestress is desired in the screw. The pre-tensioning is accomplished by using a pre-tightening washer under the screw head or a nut.

BACKGROUND OF THE INVENTION

Usually this is attempted by placing a washer under a screw or nut to make it easier to tighten the screw by torsional moment, to reduce surface pressure exerted on the support or to ensure the fixing of the screw by shaping the washer suitably. By means of an appropriately shaped washer, a bending effect on the screw by a sloped support can be avoided, or the washer can be used for sealing the coupling or for galvanic insulation of the parts of the coupling. The washer can also be shaped, for example forming it cup-like, so that it will be straightened upon tightening and cause tensile stress in the screw.

In most screw couplings, a sufficient and accurate pre-tensioning of the screw is necessary for the reliable functioning of the coupling. A desired prestress is effected by turning the screw to a tighter position by applying torsional moment or by stretching the screw by a predetermined force corresponding to the desired prestress before the nut or screw is screwed down.

The screw is tightened by means of torsional moment, often with the help of a torsion tool which turns the screw or nut, where often the screw or nut must be held on the opposite side in order to succeed in the tightening. To bring about a certain, predefined tensile stress in the screw, the tool must be provided with a torque restriction or measurement. Because of many factors, such as friction, the prestress brought about in the screw by means of torsional moment is rather inaccurate. Further, the pre-tensioning taking place through the torsional moment causes shear stress in the screw which leads to the dissipation of a part of the pre-tensioning potential of the screw.

The screw can also be warmed up before its assembly, whereby it is stretched by thermal expansion. After the screw has been assembled hot and stretched to the desired extension, it, upon cooling, tightens the coupling, and the desired prestress will remain in the screw. The screw can also be warmed up by means of a heating element placed in a hole bored therein, for example by using an electric resistance. The drawback of the pre-tensioning methods based on thermal expansion is often the high temperature necessary for sufficient elongation, making the assembly difficult and possibly weakening the strength characteristics of the screw metal.

The pre-tensioning can also be performed by stretching the screw by means of pre-tensioning tools, which operate hydraulically or in some other way, as is presented for example in German publication 3733243 or Swedish publication 7701049-4. The required tools are often complicated and are not often suitable for pre-tensioning of standard screws.

U.S. Pat. No. 4,450,616 shows a washer made of shape-memory metal, used for ensuring the tightness of a screw if the screw tends to slacken. According to the publication, an elastic washer punched out of a shape-memory metal is pressed in an austenitic form at an elevated temperature (200° C.) above the $A_f$ point into a cup-like shape. When it is cooled down to the martensitic area below the $M_f$ point (below −150° C.), the screw can be easily screwed down, and the washer deforms to its disc-like shape. As the temperature rises by heat conduction above the $A_f$ point, the washer tends to recover its cup-like shape. Because of its cup-like shape and elasticity, the washer cannot stretch the screw in a manner required for the pre-tensioning.

Japanese publication 62-116292 shows a spring washer intended for tightening of a nuclear reactor container cover. The washer is of shape-memory metal and designed to tighten the bolt in order to maintain the sealing effect as the temperature increases and the bolt is extended by thermal expansion. That invention is not suitable for pre-tensioning of a bolt.

SUMMARY OF THE INVENTION

A washer according to the invention, offers a very simple way to produce a prestress of a desired degree without the use of special tools. The screws and nuts can be usual, standard screws and nuts. The pre-tensioning method according to the invention does not excert torsional shear stress in the screw either, and the whole pre-tensioning potential of the screw can be utilized if desired. The screw can also be pre-tensioned in a place where the shape of the space or lack of space limits the use of tools.

The invention is based on a phase transformation occurring in the crystal structure of the shape-memory metal, effected by temperature. The phenomenon is called martensitic reaction. The shapes and volumes of pieces made of shape-memory metal alloys are recovered exactly to correspond to the original status at a relatively low temperature on heating after a deformation caused by an external force. The recovery is typically complete after a deformation of 4–8%. The martensitic reaction starts and takes place in a quite narrow tansition temperature range of typically ca. 20° C. (range $A_s$ to $A_f$), which can usually be fitted in a desired area within the temperature range of −30° . . . +100° C. Under certain conditions, the martensitic reaction is crystal lographically completely reversible. The deformations of shape-memory metals are not based on thermal expansion but on a phase change in the crystalline structure triggered by a temperature change. The transformation takes place quickly once the transformation temperature has been attained. Because of the low transformation temperature, large amounts of heat are not required.

The shape-memory metals exist as two main groups, whereof one shows a one-way shape-memory effect and the other a two-way effect. In those shape-memory metals based on the one-way shape-memory effect, the deformation triggered by a predetermined transformation temperature is irreversible. In the case of the two-way shape-memory effect, the deformation is reversible as the piece is being cooled below a predetermined temperature (range $M_s$ to $M_f$). Hereinafter, a shape-memory metal based on the one-way shape-memory effect will be designated one-way shape-memory metal, and a shape-memory metal based on the two-way shape-memory effect will be designated two-way shape-memory metal, and the temperatures will be designated upper transformation temperature ($A_f$) and respectively lower transformation temperature ($M_f$).

Several shape-memory metal alloys can withstand very high stresses without plasticizing and losing their shape-memory characteristics, even 800 to 1000N/mm², and consequently a washer made of such metal can produce large forces in connection with the deformation.

BRIEF DESCRIPTION OF THE DRAWINGS

In the following, the invention will be described in more detail with reference to the accompanying drawings, wherein.

DESCRIPTION OF THE PREFERRED EMBODIMENTS

Figure 1:
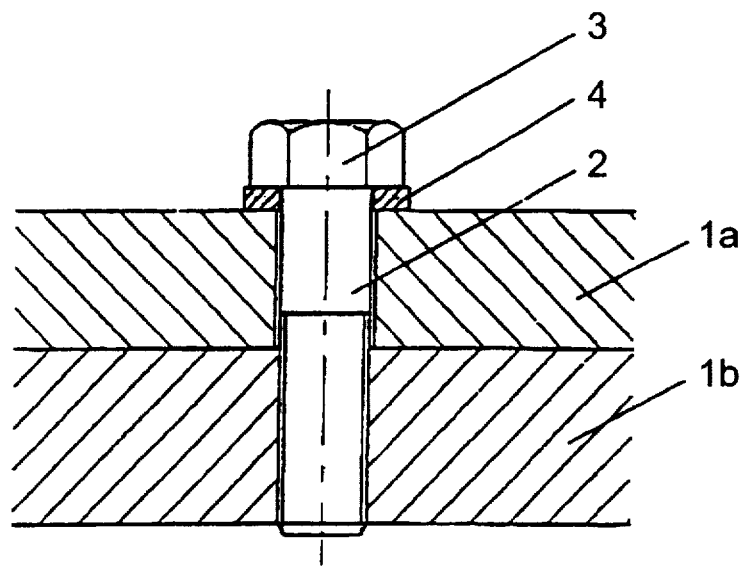
FIG. 1 shows a sectional view of a screw having a washer made of shape-memory metal placed under its head.

The operation of a washer 4 made of a one-way shape-memory metal is shown in FIG. 1. The thickness of the shape-memory metal washer 4, is dimensioned in view of the length of screw 2 to be pre-tensioned and the pre-tensioning need. The washer 4 is assembled in place between a head 3 of the screw 2 and a piece 1a to be fastened. The screw 2 is screwed lightly down. The washer 4 is heated to the upper transformation temperature by means of a heating device, which can be a usual hot-air fan, whereby the washer 4 will expand and will cause the screw 2 to be tensioned to the using state. The screw 2 can be released in normal ways.

When a washer 4 made of a two-way shape-memory metal is used, the pre-tensioning takes place in the same manner as described hereinabove. The release of the screw 2 can be accomplished by cooling the washer 4 to the lower transformation temperature, for example by using dry ice, whereupon the washer 4 recovers its original dimensions, and the screw can be released by rotating it lightly without using strong tools. The two-way shape-memory metal washer can be used again several times.

Figure 2:
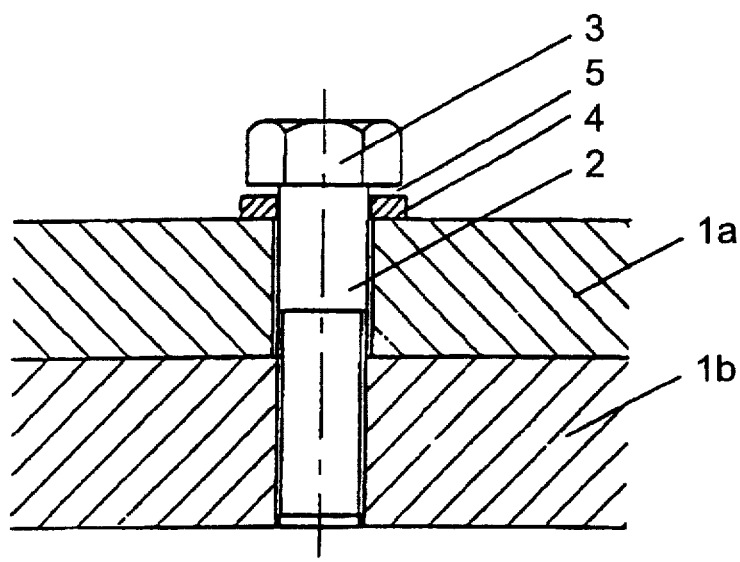
FIG. 2 shows a sectional view of a screw having a shape-memory metal washer placed under its head and having a clearance between the washer and the screw head for adjusting the prestress.

In the invention according to FIG. 2, a clearance 5 is left between the screw head 3 and the shape-memory metal washer 4. By adjusting the size of the clearance 5, the extent of the screw elongation and consequently the tightening effect of the screw can be influenced.

The clearance 5 can be calculated in normal ways, which are not described here more closely, when the dimensions of the screw and the properties of the shape-memory metal washer are known. The use of the clearance enables the use of standard-sized shape-memory metal washers together with screws of varying lengths.

It is apparent to a person skilled in the art that the applications shown by FIGS. 1 and 2 are only examples of the operation of the washer according to the invention. The washer can equally be used also in screw/nut couplings both for screws having heads and for tenons.

It is also apparent to a person skilled in the art that the pre-tensioning washer according to the invention can also be used in association with fastening elements other than screws and nuts. It is also clear that washers can be disposed several on top of each other at the same tightening point, whereby a set of more than one washer (for example having standardized thicknesses) can be utilized for pre-tensioning screws of varying lengths by washers of identical thicknesses.

The pre-tensioned screws show a pre-tensioning elongation in a magnitude of typically 0.2% of the stretchable length, if the screw is manufactured of steel. On the other hand, the deformation capability of the shape-memory metals, in this case the capability of producing elongation, is in the magnitude of 4-8%, as mentioned hereinabove. It is thus possible to attain an elongation sufficient for the screw pre-tensioning using a relatively thin washer.

The elongation of the screw can be measured more accurately, if desired, in a hole bored in the screw center or possibly in the washer.

As a practical example, the tightening of a screw M24×3 8.8 SFS 2063 of total length of 315 mm by means of shape-memory metal washer is presented.

It is supposed that the screw is disposed in a threaded hole over the length of 1.5 times the diameter, resulting in the stretchable length of ca. 259 mm. If the screw is tightened 90% of yield point, the prestress equals $576 N/mm^2$. The pre-tensioning force is in this case 195 000N and the screw elongation ca. 0.54 mm (0.2% of the stretchable length).

If it supposed that an elongation of 5% is attained through the shape-memory metal, the required thickness of the shape-memory metal washer will be ca. 11 mm. (On supposing that the elastic modulus of the shape-memory metal and that of steel are the same. A difference in the elastic moduli has an effect on the thickness of the needed washer.)

When a shape-memory metal washer of a 36 mm outer diameter, 26 mm inner diameter and 11 mm thickness is used, the compression stress in the washer as well as the surface pressure under the washer will be $400 N/mm^2$.

The invention should not be construed as limited to the above description and form, variations will be apparent to those skilled in the art.

The use of the enclosed invention is not restricted to any single way to warm up the shape-memory metal washer. Sometimes it may be advantageous to bring the whole machine part in question to the temperature triggering the function of the shape-memory metal, especially if there are a lot of fastening points.

In this text, the word shape-memory metal has been used, and it denotes a metal, in most cases a metal alloy, where longitudinal dimension changes occur by virtue of crystalline properties, and not for example by virtue of thermal expansion, and where the changes are permanent within the limits set by threshold values. For example, well-known nickel-titanium alloys provided with additives can be used, but the invention is not limited only to these alloys or presently known alloys.

I claim:

1. A plate-like washer of generally annular shape, said washer adapted to be placed between a fastening element and a piece to be fastened to form a coupling for a predetermined pretensioning of said fastening element, said washer being made of a one-way shape-memory metal whose upper transformation temperature is higher than the use and assembly temperature of said coupling, whereby a pre-determined amount of tension is applied to the fastening element when said washer is actively heated, said washer having a thickness dimensioned in view of the length and pretensioning need of said fastening element and the amount of expansion that occurs at said washer's upper transformation temperature.

2. A plate-like washer of generally annular shape, said washer adapted to be placed between a fastening element and a piece to be fastened to form a coupling for a predetermined pretensioning of said fastening element, said washer comprising a shape-memory metal whose upper transformation temperature is higher than the use and assembly temperature of said coupling, whereby a pre-determined amount of tension is applied to the fastening element when said washer is actively heated, said washer having a thickness dimensioned in view of the length and pretensioning need of said fastening element and the amount of expansion that occurs at said washer's upper transformation temperature, and said washer further having a lower transformation temperature which is lower than the lowest use temperature of the coupling.

3. A method for pretensioning at least two structural members to form a coupling by means of a fastening element, said method comprising the steps of:

1) selecting a washer made of a shape memory metal to have an upper transformation temperature higher than the use and assembly temperature of said coupling;

2) adapting the dimensions of said washer in view of the length and pretensioning need of said fastening element and the expansion that occurs at the upper transformation temperature of said washer;

3) placing said washer between said fastening element and a piece to be fastened;

4) providing a clearance between said fastening element and said washer, said clearance being adapted in view of the properties of said fastening element and said washer, so that the desired pre-stress is achieved when the coupling is brought to the upper transformation temperature; and 5) heating said washer whereby said washer reaches its upper transformation temperature and deforms to produce the desired amount of pretension on said fastening element.

4. Method according to claim 3, further comprising the steps of using a two-way shape-memory metal washer and cooling the washer to its lower transformation temperature lying lower than the use temperature of the coupling such that the coupling can be disassembled.

* * * * *